(12) United States Patent
Tamminga

(10) Patent No.: US 11,102,923 B2
(45) Date of Patent: Aug. 31, 2021

(54) AGRICULTURAL SPREADER AND BEATER ASSEMBLY THEREFORE

(71) Applicant: Jay-Lor International Inc., East Garafraxa (CA)

(72) Inventor: Jakob R. Tamminga, East Garafraxa (CA)

(73) Assignee: Jay-Lor International Inc., East Garafraxa (CA)

( * ) Notice: Subject to any disclaimer, the term of this patent is extended or adjusted under 35 U.S.C. 154(b) by 118 days.

(21) Appl. No.: 16/223,217

(22) Filed: Dec. 18, 2018

(65) Prior Publication Data

US 2019/0183035 A1 Jun. 20, 2019

Related U.S. Application Data

(60) Provisional application No. 62/607,982, filed on Dec. 20, 2017.

(51) Int. Cl.
*A01C 3/06* (2006.01)
*A01C 15/16* (2006.01)

(52) U.S. Cl.
CPC .............. *A01C 3/066* (2013.01); *A01C 15/16* (2013.01)

(58) Field of Classification Search
CPC ....... A01C 3/066; A01C 15/16; A01C 17/001; A01C 17/008; E01C 19/203; E01C 2019/2055; B01F 7/00208; B01F 7/00216; A01K 5/004

USPC .......................... 239/665, 667, 681, 682, 687
See application file for complete search history.

(56) References Cited

U.S. PATENT DOCUMENTS

| 2002/0117562 A1* | 8/2002 | Kost | .................... | A01C 17/008 239/666 |
| 2006/0169806 A1* | 8/2006 | Neier | .................... | A01C 3/066 239/667 |

* cited by examiner

*Primary Examiner* — Darren W Gorman
(74) *Attorney, Agent, or Firm* — Calfee, Halter & Griswold LLP

(57) ABSTRACT

An agricultural spreader is disclosed. The spreader comprises a holding box for containing a spreadable load to be spread; and a beater section in communication with the holding device for outputting the spreadable load. The beater section comprises an upright beater having flighting depending therefrom including a spinner deck defining substantially a bottom flight thereof, the spinner deck comprising a plurality of paddles oriented for throwing the spreadable load during operation of the beater, a beater tray situated at the bottom of the upright beater with the upright beater mounted thereon and having a front side facing the holding box. The beater tray comprises a floor and a front wall rising therefrom for at least partially blocking the spreadable load from being thrown toward the holding box. The front wall comprises a soft/flexible section shaped to substantially correspond with a front portion of the footprint of the spinner deck.

18 Claims, 3 Drawing Sheets

AGRICULTURAL SPREADER AND BEATER ASSEMBLY THEREFORE

RELATED APPLICATIONS

This application claims the benefit of priority from U.S. provisional patent application Ser. No. 62/607,982 filed Dec. 20, 2017 which is incorporated herein by reference in its entirety.

FIELD OF THE INVENTION

The invention relates to agricultural machinery and more specifically to spreaders and beater assemblies therefore for spreading agricultural material such as manure.

BACKGROUND

Agricultural spreaders, such as manure spreaders or compost spreaders, are typically used to spread or throw organic material such as manure, for use as organic fertilizer, over and onto a field or pasture. A spreader generally comprises a holding box or other suitable vessel for holding the manure and beater section, sometimes referred to as a beater assembly, for throwing the manure outwards from the spreader as it moves along. The beaters of the spreader include paddles attached to the bottom section or bottom flighting of the beaters, referred to as the spinner deck, that are shaped and positioned to throw the manure during rotation of the beater. In various spreaders, the manure may be thrown outwards a distance of about 45 feet thereby creating a significant swath within which organic fertilizer is deposited.

Often, the manure that is used as organic fertilizer is obtained from the bottom of an animal pen, such as a cattle pen, is composted to reduce the moisture content and is then used for spreading. Manure obtained from an animal pen is often comprised of a significant sand content the pen can include a sand based floor and when the manure is scraped from the floor during collection, sand is also captured and included with the manure. When this manure is used for spreading it tends to be very gritty and coarse and as a result tends to wear out components of the spreader relatively quickly. As outlined above, the manure after being composted includes a lot of sand and other resulting in a very coarse nature that tends to harden in the dead areas of the beater tray and/or along any hard edge. For example, the manure tends to collect and harden along certain areas of the beater section, such as the beater tray and front wall of the beater tray, and cause significant wear and tear or erosion of the paddles.

Typically, the paddles are made from steel and have been observed to wear out in about 160 acres of usage. The steel paddles then need replacing requiring both replacement paddles and downtime of the spreader for instituting said replacement which typically involves cutting off the worn paddles and welding on the new ones. One prior solution has been to replace the steel paddles with paddles made from chromium carbide to achieve a longer life. This is a very expensive solution that does not mitigate the build-up and collection of the coarse manure in the beater tray.

A need therefore exists for a spreader that can reduce, mitigate or solve any one or more of the issues associated with prior and/or current spreaders as outlined herein or as observed in the industry.

SUMMARY OF THE INVENTION

An agricultural spreader, such as a manure spreader, is disclosed that implements a soft flexible component into the front wall of the beater tray. The soft component is used in a section of the front wall that is also adapted to conform to or correspond with at least a portion of the front of the footprint of the beater(s) in the beater section also definable as the outer limit of the path of travel of the paddles during rotation of the beater(s). In this way, the dead zone in which the manure can build-up and become hardened is reduced and the soft flexible nature of the soft section of the front wall adjacent the beater discourages the build-up of manure, or other, that then hardens and causes wear on the paddles of the beater as it rotates.

In one embodiment, the present invention provides for an agricultural spreader for spreading a spreadable load, the spreader comprising:
  a holding box for containing a spreadable load, such as a suitable organic fertilizer or a suitable organic material, to be spread; and
  a beater section in communication with the holding device for outputting the spreadable load from the spreader, the beater section comprising:
    an upright beater having flighting depending therefrom including a spinner deck defining substantially a bottom flight thereof, the spinner deck comprising a plurality of paddles oriented for throwing the spreadable load during operation of the beater,
    a beater tray situated at the bottom of the upright beater with the upright beater mounted thereon and having a front side facing the holding box, the beater tray comprising a floor and a front wall rising therefrom for at least partially blocking the spreadable load from being thrown toward the holding box, the front wall comprising a soft and/or flexible section shaped to substantially correspond with a front portion of the footprint of the spinner deck.

In an further embodiment of the spreader or spreaders outlined above, the beater section comprises a pair of adjacent upright beaters and the soft and/or flexible section of the beater tray is shaped to substantially correspond with a front portion of the footprint of the spinner decks of the adjacent upright beaters.

In an further embodiment of the spreader or spreaders outlined above, the beater tray has a generally rectangular shape and the front wall comprises one or more enclosed sections spanning the front side and the soft and/or flexible section, for example an enclosed mid-section and/or an enclosed corner section.

In an further embodiment of the spreader or spreaders outlined above, the front side of the beater tray is shaped to substantially correspond with a front portion of the footprint of the spinner deck(s).

In an further embodiment of the spreader or spreaders outlined above, the soft and/or flexible section is comprised of a soft and/or flexible surface material sufficiently deformable and/or flexible to reduce or prevent sticking, build-up and/or hardening of the spreadable load against the soft and/or flexible section.

In an further embodiment of the spreader or spreaders outlined above, the soft and/or flexible section is adapted to be substantially adjacent to at least a front portion of the path of the plurality of paddles during rotation of the beaters to prevent or reduce sticking, build-up and/or hardening of the spreadable load against the soft and/or flexible section.

In an further embodiment of the spreader or spreaders outlined above, the soft and/or flexible section is comprised of a flexible plastic, a flexible steel, metal or alloy, a polymer, a rubber, a puck board, Teflon, or nylon.

In an further embodiment of the spreader or spreaders outlined above, the soft and/or flexible section is a spray-on material or a bolt on material.

In an further embodiment of the spreader or spreaders outlined above, the spreadable load is a manure, a compost any other suitable organic fertilizer, or any suitable organic material.

In yet a further embodiment, the present invention provides for a beater section for an agricultural spreader for outputting a spreadable load, such as a suitable organic fertilizer or a suitable organic material, from the spreader, the beater section comprising:

an upright beater having flighting depending therefrom including a spinner deck defining substantially a bottom flight thereof, the spinner deck comprising a plurality of paddles oriented for throwing the spreadable load during operation of the beater, a beater tray situated at the bottom of the upright beater with the upright beater mounted thereon and having a front side for facing a holding box, the beater tray comprising a floor and a front wall rising therefrom for at least partially blocking the spreadable load from being thrown toward the holding box, the front wall comprising a soft and/or flexible section shaped to substantially correspond with a front portion of the footprint of the spinner deck.

In an further embodiment of the beater section or beater sections outlined above, the beater section comprises a pair of adjacent upright beaters and the soft and/or flexible section of the beater tray is shaped to substantially correspond with a front portion of the footprint of the spinner decks of the adjacent upright beaters.

In an further embodiment of the beater section or beater sections outlined above, the beater tray has a generally rectangular shape and the front wall comprises one or more enclosed sections spanning the front side and the soft and/or flexible section, for example an enclosed mid-section and/or an enclosed corner section.

In an further embodiment of the beater section or beater sections outlined above, the front side of the beater tray is shaped to substantially correspond with a front portion of the footprint of the spinner deck(s).

In an further embodiment of the beater section or beater sections outlined above, the soft and/or flexible section is comprised of a soft surface material sufficiently deformable and/or flexible to reduce or prevent sticking, build-up and/or hardening of the spreadable load against the soft section.

In an further embodiment of the beater section or beater sections outlined above, the soft and/or flexible section is adapted to be substantially adjacent to at least a front portion of the path of the plurality of paddles during rotation of the beaters to prevent or reduce sticking, build-up and/or hardening of the spreadable load against the soft and/or flexible section.

In an further embodiment of the beater section or beater sections outlined above, the soft and/or flexible section is comprised of a flexible plastic, a flexible metal, steel or alloy, a polymer, a rubber, a puck board, Teflon, or nylon.

In an further embodiment of the beater section or beater sections outlined above, the soft and/or flexible section is a spray-on material or a bolt on material.

In an further embodiment of the beater section or beater sections outlined above, the spreadable load is a manure, a compost, any other suitable organic fertilizer or any suitable organic material.

DETAILED DESCRIPTION

Described herein are examples and embodiments of apparatuses, systems, methods and processes, for spreading agricultural material such as manure or compost, which may be used as an organic fertilizer, or other organic fertilizer or organic material such as paper waste and potash. It will be appreciated that embodiments and examples are provided herein for illustrative purposes intended for those skilled in the art, and are not meant to be limiting in any way. All references to embodiments or examples throughout this disclosure should be considered as references to illustrative and non-limiting embodiments and illustrative and non-limiting examples. It will be appreciated that none of the features disclosed herein are intended to be essential unless specifically stipulated as such. Reference to any dimensions or measurements is not intending to be limiting and is not intended to be a precise measurement and the term "about" is intended to be applied to all such dimensions and measurements and at least accounts for inaccuracies and error associated with taking such measurements and the devices for such measurements.

An agricultural spreader, such as a manure spreader or compost spreader, is disclosed that implements a soft and/or flexible component into the front wall of the beater tray. The soft and/or flexible component is used in a section of the front wall that is also adapted to conform to or correspond with at least a portion of the front of the footprint of the beater(s) in the beater section also definable as the outer limit of the path of travel of the paddles during rotation of the beater(s). In this way, the dead zone in which the organic material, such as manure, can build-up and become hardened is reduced and the soft and/or flexible nature of the soft/flexible section of the front wall adjacent the beater discourages the build-up of manure, or other, that then hardens and causes wear on the paddles of the beater as it rotates. These features will be explained in further detail with reference to FIGS. 1-3 which show an illustrative embodiment of a spreader including one variation of the beater section.

Figure 1:
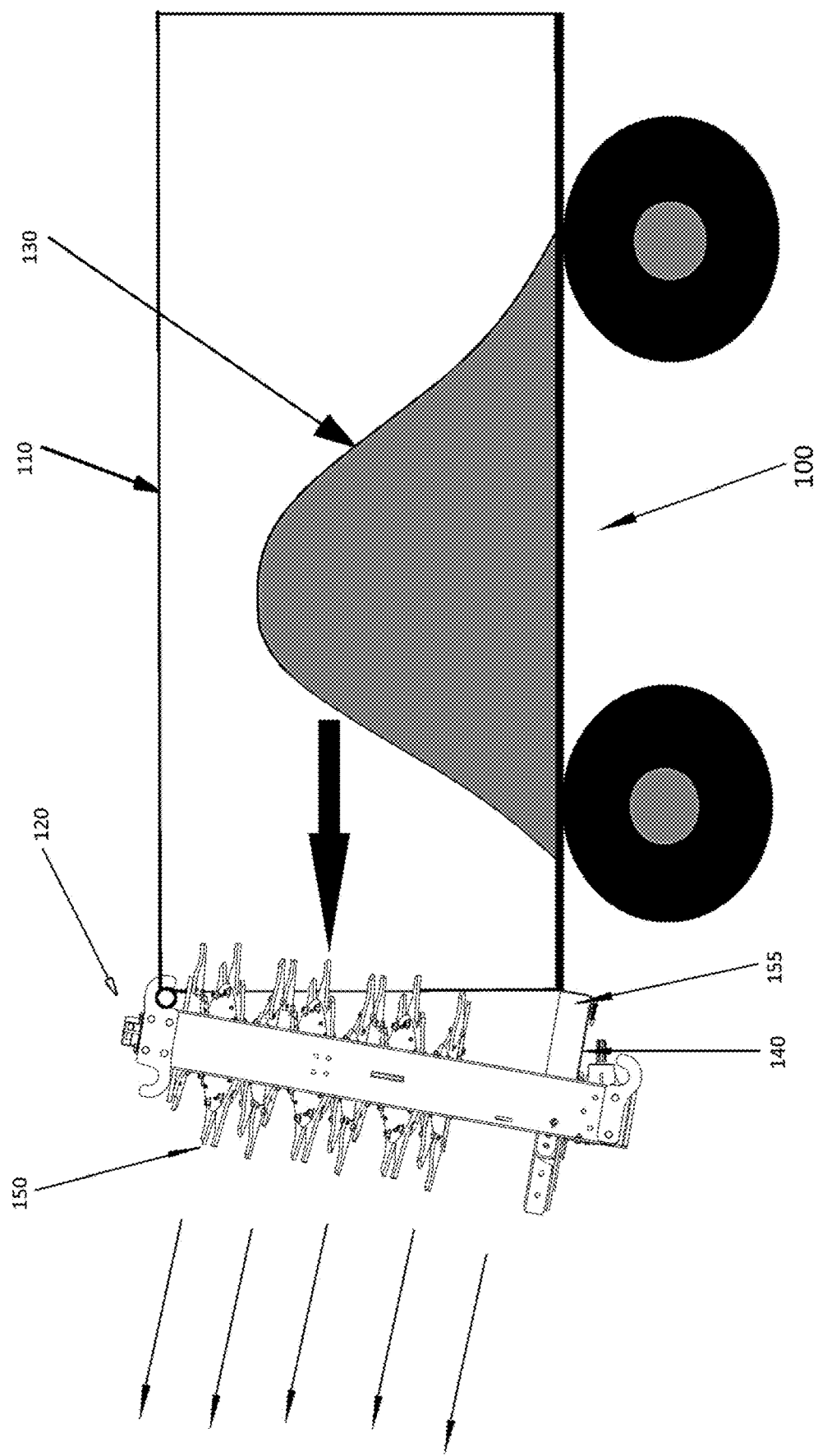
FIG. 1 is a schematic side view of one embodiment illustrative of a spreader, for example a manure spreader, including various optional features for spreading agricultural material such as manure, compost or other organic material or organic fertilizer.

One embodiment of an agricultural spreader, such as a manure spreader, is shown generally at 100 in FIG. 1. This particular spreader includes a holding box 110 for a spreadable load 130, such as compost or manure or other organic fertilizer or organic material. As will be appreciated, any suitable holding box 110 may be used such as a load-moving box or other provided the holding box 110 can hold the spreadable load 130 and discharge it to the beater section 120 for spreading as desired. The spreader 100 also includes a beater section 120, also referred to as a beater assembly. The spreadable load 130 is discharged into the beater section 120 where one or more upright beaters 150 throw the load outwards and over the ground. Typically, the spreadable load 130 is a compost or manure that may be used as an organic fertilizer and the beater section 120 throws the manure out over a field or pasture to be fertilized. It will be appreciated that an organic fertilizer generally refers to fertilizers of an organic or biologic origin, such as but not limited to, animal wastes, plant wastes from agriculture, compost, and treated sewage sludge (biosolids). Further, the spreader may be used to spread organic material such as paper waste or potash.

Figure 2:
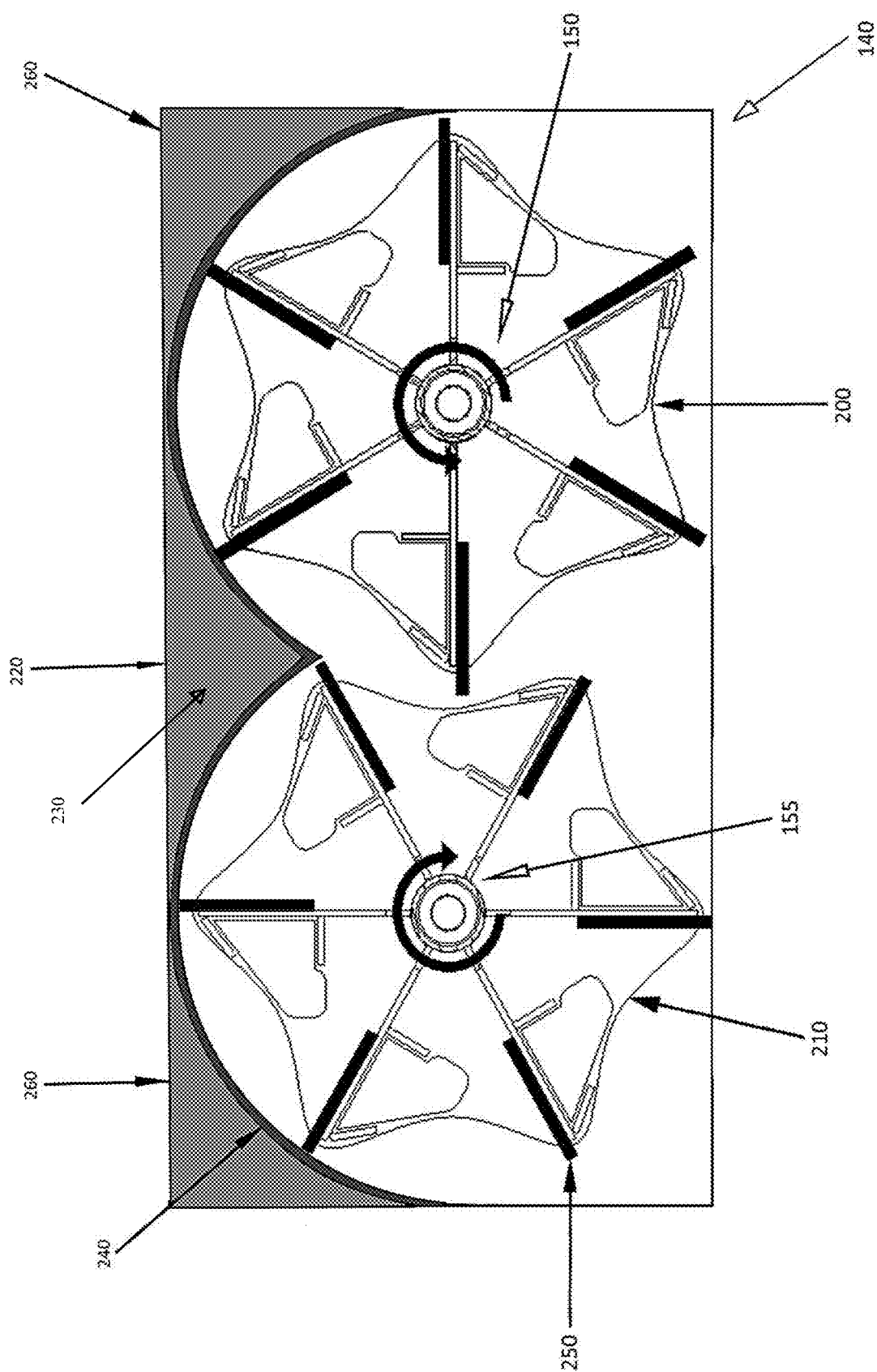
FIG. 2 is a top schematic view showing one embodiment of a beater tray of a beater assembly of the spreader shown in FIG. 1.
Figure 3:
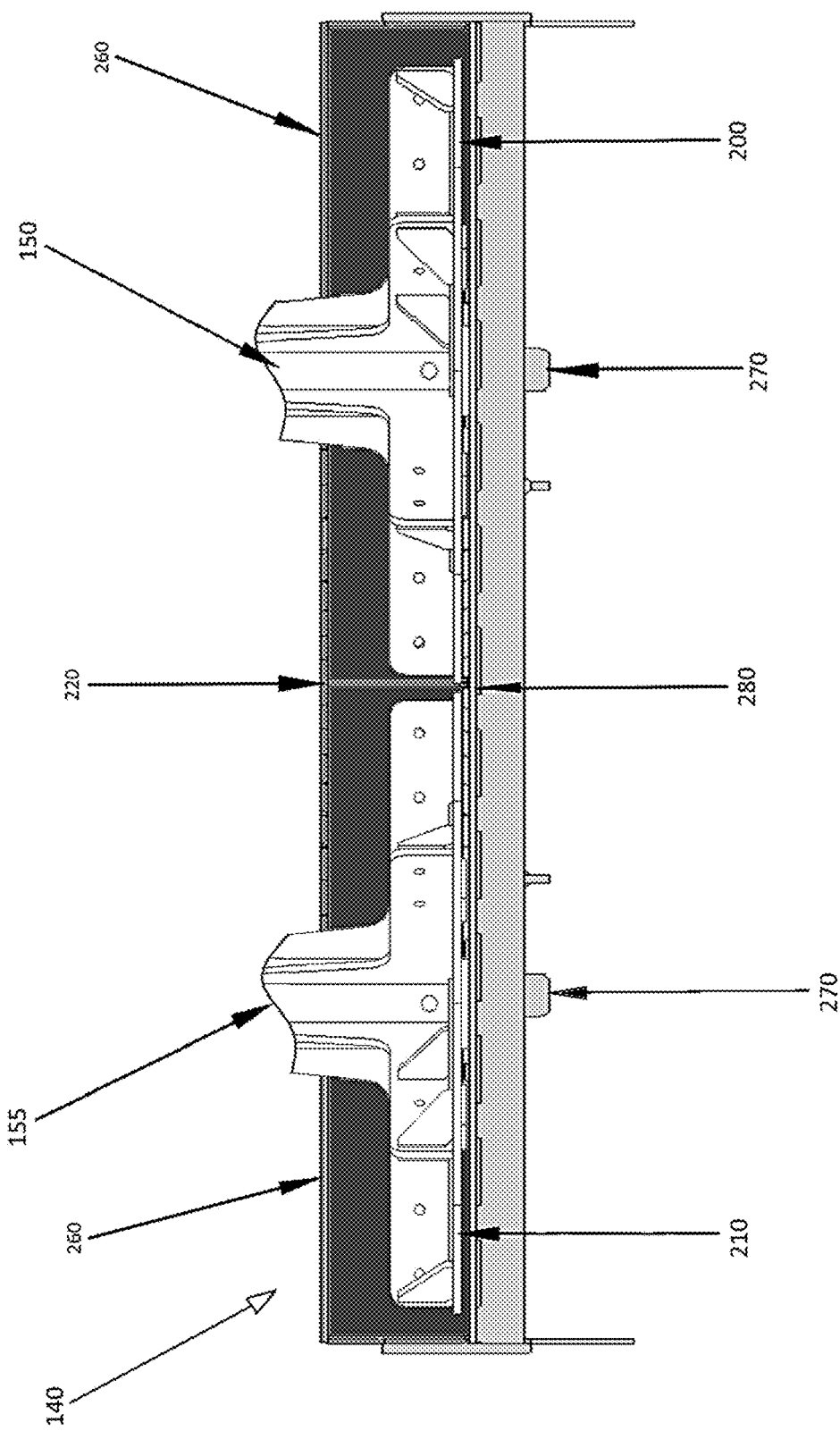
FIG. 3 is a side schematic view a lower section of the beater tray shown in FIG. 2 showing the spinner decks of the beaters.

The beater section 120 is shown in more detail in FIGS. 2 and 3. The beater section 120 typically comprises a pair of upright beaters 150 and 155 that spin in opposite directions. For example the right side beater 150 can spin in a counter-clockwise direction and can be referred to as the counter-clockwise beater 150. The left side beater 155 can spin in a clockwise direction and can be referred to as the clockwise beater 155. The beaters 150 and 155 are driven via a drive shaft 270 powered by any suitable power source. Each beater includes flighting for capturing, guiding and accelerating the spreadable load as the beater turns. The bottom section or bottom flight of the beater is referred to as the spinner deck 200 and 210 and includes paddles 250 for throwing the spreadable load outwards from the spreader. The paddles 250 may be made from steel or other more wear resistant material.

The beaters 150 and 155 are positioned in a beater tray 140 defined by a floor 280 and a front wall 230 positioned at the front of the tray toward the holding box 110. The front wall 230 is used to reduce or prevent the spreadable load from being thrown forwards back towards the holding box 110. Typically, in prior art spreaders, the front wall is a straight wall and is simply placed at the front edge of the floor of the tray 140. However, placing the front wall straight across the front edge of the tray creates dead zones in the front corners and mid-section of the front of the tray where manure or other spreader load can build-up and harden and the coarse nature of the hardened manure or other spreadable load can wear out the paddles of the beaters as the paddles rub on the hardened manure as they pass by during rotation of the beaters. It has also been observed that manure tends to build-up and harden on hard rigid surfaces such as the steel front wall of prior art spreaders.

To prevent or reduce the build-up and hardening of the manure, the front wall 230 includes a soft/flexible section 240 positioned adjacent at least a portion of the path of travel of the paddles 250 during rotation of the beaters 150 and 155. Effectively, the soft/flexible section 240 of the front wall 230 corresponds with at least a portion of the front of the footprint of the spinner deck which may also be defined as the outside limit of the path of travel of the paddles as the beater rotates. The corners and mid-section may be enclosed as shown in FIG. 2 at the enclosed corners 260 and enclosed mid-section 220 thereby reducing or even eliminating the dead zone where manure may build-up and harden.

By providing a soft/flexible section 240 adjacent a portion of the front area of the path of travel of paddles, manure has a lowered tendency to stick to the front wall 230 as the soft/flexible section 240 deforms or flexes slightly as the paddles pass by making it difficult for the manure to build-up and stick to the soft/flexible section 240 of the front wall 230.

Alternatively, the front wall 230 may take the shape of the footprint of the spinner decks 200 and 210 thereby obviating the need to have enclosed sections to remove dead zones. In such a setup, the floor 280 may be cut to remove excess unused flooring and the soft/flexible section 240 is simply placed against the front wall 230 as the front wall already has an appropriate shape that corresponds with the outer limit of the path of travel of the paddles of the beaters as they rotate.

It will be appreciated that the soft/flexible section may be comprised of any suitable material that is either soft or flexible and that such material flexes and/or deforms a sufficient amount to discourage, reduce or prevent build-up, sticking and hardening of the spreadable load, such as manure, thereto. Optional and suitable materials that may form the soft section 240 include for example a flexible plastic, flexible metal, steel or alloy, polymer, rubber, puck board, Teflon, or nylon and may be spray on or bolt on as desired. For example, a thin stainless steel section may be used that is held at either end so that it flexes in toward the middle.

It will be appreciated that the shape of the front wall 230 and the soft/flexible section 240 have been described as being adjacent the outer limit of the path of travel of the paddles of the beater as the beater rotates and that the soft section may cover a portion, a minority, a majority or all of a front area of this path of travel. The soft/flexible section 240 and the front wall 230 may be positioned to have a small gap between the outer limit of the path of travel of the beaters and it is not essential that the soft/flexible section 240 be positioned to be precisely at the outer limit of this path of travel, also referred to herein as the footprint of the spinner deck(s).

Further, it will be appreciated that the spreader may be used to spread any suitable spreadable load and the spreader is not limited to organic fertilizer, compost or manure but may be used to spread other organic fertilizers and/or organic materials such as paper waste and potash.

One or more illustrative embodiments have been described by way of example. It will be understood to persons skilled in the art that a number of variations and modifications can be made without departing from the scope and spirit of the invention as defined herein and in the claims.

I claim:

1. An agricultural spreader for spreading a spreadable load, the spreader comprising:
   a holding box for containing a spreadable load to be spread; and
   a beater section in communication with the holding box for outputting the spreadable load from the spreader, the beater section comprising:
      an upright beater having fighting depending therefrom including a spinner deck defining substantially a bottom flight thereof, the spinner deck comprising a plurality of paddles oriented for throwing the spreadable load during operation of the beater,
      a beater tray situated at the bottom of the upright beater with the upright beater mounted thereon and having a front side facing the holding box, the beater tray comprising a floor and a front wall rising therefrom for at least partially blocking the spreadable load from being thrown toward the holding box, the front wall comprising a soft and/or flexible section shaped to substantially correspond with a front portion of the footprint of the spinner deck, the soft and/or flexible section being comprised of a soft and/or flexible surface material sufficiently deformable and/or flexible to reduce or prevent sticking, build-up, and/or hardening of the spreadable load against the soft and/or flexible section.

2. The spreader of claim 1, wherein the beater section comprises a pair of adjacent upright beaters and the soft and/or flexible section of the beater tray is shaped to substantially correspond with a front portion of the footprint of the spinner decks of the adjacent upright beaters.

3. The spreader of claim 1, wherein the beater tray has a generally rectangular shape and the front wall comprises one or more enclosed sections spanning the front side and the soft and/or flexible section, and wherein the one or more enclosed sections comprise an enclosed mid-section and/or an enclosed corner section.

4. The spreader of claim 1, wherein the front side of the beater tray is shaped to substantially correspond with a front portion of the footprint of the spinner deck.

5. The spreader of claim 2, wherein the soft and/or flexible section is adapted to be substantially adjacent to at least a front portion of the path of the plurality of paddles during rotation of the beaters to prevent or reduce sticking, build-up and/or hardening of the spreadable load against the soft and/or flexible section.

6. The spreader of claim 1, wherein the soft and/or flexible section is comprised of a flexible plastic, a flexible steel, metal or alloy, a polymer, a rubber, a puck board, polytetrafluoroethylene (PTFE), or nylon.

7. The spreader of claim 1, wherein the soft and/or flexible section is a spray-on material or a bolt on material.

8. The spreader of claim 1, wherein the spreadable load is a manure, a compost, any other suitable organic fertilizer, or any suitable organic material.

9. A beater section for an agricultural spreader for outputting a spreadable load from the spreader, the beater section comprising:
an upright beater having fighting depending therefrom including a spinner deck defining substantially a bottom flight thereof, the spinner deck comprising a plurality of paddles oriented for throwing the spreadable load during operation of the beater,
a beater tray situated at the bottom of the upright beater with the upright beater mounted thereon and having a front side for facing a holding box, the beater tray comprising a floor and a front wall rising therefrom for at least partially blocking the spreadable load from being thrown toward the holding box, the front wall comprising a soft and/or flexible section shaped to substantially correspond with a front portion of the footprint of the spinner deck, wherein the soft and/or flexible section is comprised of a soft surface material sufficiently deformable and/or flexible to reduce or prevent sticking, build-up and/or hardening of the spreadable load against the soft section.

10. The beater section of claim 9, wherein the beater section comprises a pair of adjacent upright beaters and the soft and/or flexible section of the beater tray is shaped to substantially correspond with a front portion of the footprint of the spinner decks of the adjacent upright beaters.

11. The beater section of claim 9, wherein the beater tray has a generally rectangular shape and the front wall comprises one or more enclosed sections spanning the front side and the soft and/or flexible section, and wherein the one or more enclosed sections comprise an enclosed mid-section and/or an enclosed corner section.

12. The beater section of claim 9, wherein the front side of the beater tray is shaped to substantially correspond with a front portion of the footprint of the spinner deck.

13. The beater section of claim 10, wherein the soft and/or flexible section is adapted to be substantially adjacent to at least a front portion of the path of the plurality of paddles during rotation of the beaters to prevent or reduce sticking, build-up and/or hardening of the spreadable load against the soft and/or flexible section.

14. The beater section of claim 9, wherein the soft and/or flexible section is comprised of a flexible plastic, a flexible metal, steel or alloy, a polymer, a rubber, a puck board, polytetrafluoroethylene (PTFE), or nylon.

15. The beater section of claim 9, wherein the soft and/or flexible section is a spray-on material or a bolt on material.

16. The beater section of claim 9, wherein the spreadable load is a manure, a compost, any other suitable organic fertilizer or any suitable organic material.

17. The spreader of claim 1, wherein the spreadable load is a suitable organic fertilizer or a suitable organic material.

18. The beater section of claim 9, wherein the spreadable load is a suitable organic fertilizer or a suitable organic material.

\* \* \* \* \*